US011810162B2

(12) United States Patent
Preston et al.

(10) Patent No.: US 11,810,162 B2
(45) Date of Patent: *Nov. 7, 2023

(54) SYSTEMS AND METHODS FOR USING SMART CONTRACTS TO CONTROL THE TRADE, SUPPLY, MANUFACTURE, AND DISTRIBUTION OF COMMODITIES

(71) Applicant: Clarovia Holdings, LLC, Bainbridge Island, WA (US)

(72) Inventors: Joseph D. Preston, Bainbridge Island, WA (US); Dan Alan Preston, Bainbridge Island, WA (US); Trinitie Marie Vance, Indianola, WA (US); Brett C. Simpson, Richland, WA (US); Peter Albert Madakson, Tacoma, WA (US); William R. Rieger, Atlanta, GA (US)

(73) Assignee: Clarovia Holdings, LLC, Bainbridge Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,684

(22) Filed: Aug. 22, 2022

(65) Prior Publication Data

US 2022/0405815 A1   Dec. 22, 2022

Related U.S. Application Data

(63) Continuation of application No. 17/328,396, filed on May 24, 2021, now Pat. No. 11,423,450, which is a
(Continued)

(51) Int. Cl.
*G06Q 30/0283* (2023.01)

(52) U.S. Cl.
CPC .............................. *G06Q 30/0283* (2013.01)

(58) Field of Classification Search
CPC .................................................. G06Q 30/0283
(Continued)

(56) References Cited

U.S. PATENT DOCUMENTS 7,765,481 B2   7/2010   Dixon et al.
9,436,923 B1   9/2016   Sriram et al.
(Continued)

FOREIGN PATENT DOCUMENTS

WO   2005073882 A1   8/2005

OTHER PUBLICATIONS

David Schatsky, Getting smart about smart contracts, 2016 (Year: 2016).*
(Continued)

*Primary Examiner* — Tarek Elchanti
(74) *Attorney, Agent, or Firm* — POLSINELLI PC

(57) ABSTRACT

The present principles are directed to systems and methods for providing a trading system cooperatively integrated with manufacturing control and distribution systems, and, more specifically, to provide a trading, clearance, settlement, and depository for securities, commodities, and their derivatives (collectively "securities") that utilize asset-backed, virtualized data tokens and blockchain technology to facilitate price discovery and automated transactions at all stages of the asset development, manufacturing, and distribution of commodities.

7 Claims, 24 Drawing Sheets

Related U.S. Application Data continuation of application No. 15/675,697, filed on Aug. 11, 2017, now Pat. No. 11,037,211, which is a continuation-in-part of application No. 15/669,870, filed on Aug. 4, 2017, now Pat. No. 11,017,469.

(60) Provisional application No. 62/373,839, filed on Aug. 11, 2016, provisional application No. 62/371,098, filed on Aug. 4, 2016.

(58) Field of Classification Search
USPC .................................................. 705/7.35
See application file for complete search history.

(56) References Cited

U.S. PATENT DOCUMENTS

| | | |
|---|---|---|
| 9,641,338 B2 | 5/2017 | Sriram et al. |
| 9,849,364 B2 | 12/2017 | Tran et al. |
| 10,171,245 B2 | 1/2019 | Wilkins et al. |
| 10,417,217 B2 | 9/2019 | Pierce et al. |
| 10,552,905 B2 | 2/2020 | Wager et al. |
| 2007/0112645 A1 | 5/2007 | Traynor et al. |
| 2008/0005006 A1 | 1/2008 | Tritt et al. |
| 2012/0253852 A1 | 10/2012 | Pourfallah et al. |
| 2014/0188675 A1 | 7/2014 | Brown et al. |
| 2015/0379510 A1* | 12/2015 | Smith ............... G06Q 20/3829 705/71 |
| 2017/0091847 A1 | 3/2017 | Cama et al. |
| 2019/0080392 A1 | 3/2019 | Youb et al. |

OTHER PUBLICATIONS

David Schatsky, Getting smart about smart contracts, 2016.
Berkeley Engineering, BlockChain Technology, 2015.
"A Next Generation Smart Contract and Decentralized Application Platform"; Vitalik Buterin, 2014, 36 pages.
"A Revolution in Trust Distributed Ledger Technology in Relief & Development"; Mercy Corps, May 2017, 55 pages.
"The Use of Distributed Technologies in Payment, Clearing, and Settlement"; Lael Brainard, Institute of International Finance Blockchain Roundtable, Apr. 14, 2016, 13 pages.

* cited by examiner

Input Characterization

- ● Coal Fly Ash
- ○ Bottom Ash
- ○ Metal Slurry
- ○ Etc.

Description:

[Back] [Next]

Fig. 5

Fly Ash Composition

Input wt.% per m.ton

- SiO$_2$
- Al$_2$O$_3$
- Fe$_2$O$_3$
- CaO
- MgO
- SO$_3$
- Na$_2$O
- K$_2$O

Other Components (Select All That Apply)

- ● Rare Earth Metals
- ○ Precious Metals
- ○ Etc.

Back | Next

Pre-Treatment Outputs

Select Pre-Treatment Outputs

● Ammonium Sulfate and Calcite

○ Barium Sulfate and Calcium Chloride

○ Gypsum

○ Etc.

Next

Back

Process Output Forms

Aluminum — Aluminum Oxide ●
Iron — Iron Oxide ●
Magnesium — Magnesium Oxide ○

Aluminum Hydroxide ○
Iron (III) Hydroxide ○
Magnesium Hydroxide ●

Next

Back

Fig. 10

Input Costs

| Inputs | Low Value ($/tonne) | Median Value ($/tonne) | High Value ($/tonne) |
|---|---|---|---|
| $NaCl_{(s)}$ | $ 38.30 | $ 44.15 | $ 50.00 |
| $NH_4OH$ | $ 150.00 | $ 265.00 | $ 380.00 |
| $(NH_4)_2CO_3$ | $ 700.00 | $ 735.00 | $ 770.00 |
| Etc. | $ -- | $ -- | $ -- |

Edit Prices

Done

Back    Next

Fig. 11

Output Values

| Outputs | Low Value ($/tonne) | Median Value ($/tonne) | High Value ($/tonne) |
|---|---|---|---|
| $Al_2O_3$ | $ 300.00 | $ 400.00 | $ 500.00 |
| $Fe_2O_3$ | $ 80.00 | $ 82.50 | $ 85.00 |
| $(NH_4)_2SO_4$ | $ 215.00 | $ 237.50 | $ 260.00 |
| Etc. | $ -- | $ -- | $ -- |

Edit Prices

Done

Back

Next

Fig. 12

Economic Analysis: Inputs

Process Initialization Cost

| Chemical Formula | Mass (kg) | Value ($/tonne) | Cost |
|---|---|---|---|
| NaCl$_{(s)}$ | 294.26 | $ 44.15 | $ 12.99 |
| NH$_4$OH | 133.88 | $ 265.00 | $ 35.48 |
| | Total Startup Costs | | $ 48.47 |

Operation Cost

| Chemical Formula | Mass (kg) | Value ($/tonne) | Cost |
|---|---|---|---|
| Na$_2$CO$_3$ | 57.55 | $ 236.00 | $ 13.58 |
| (NH4)2CO3 | 129,417.23 | $ 150.00 | $ 19,412.58 |
| NH$_4$Cl | 5,704.66 | $ 75.00 | $ 427.85 |
| (NH4)2CO3 | 129,417.23 | $ 150.00 | $ 19,412.58 |
| | Total Material Costs | | $ 39,266.60 |

Fig. 14

Economic Analysis: Outputs

Selected Output Value

| Chemical Formula | Mass (kg) | Value ($/tonne) | | Cost | |
|---|---|---|---|---|---|
| $CaCO_3$ | 198,753.34 | $ | 205.00 | $ | 40,744.43 |
| $(NH_4)_2SO_4$ | 132,807.45 | $ | 237.50 | $ | 31,541.77 |
| $KCl$ | 28,169.15 | $ | 460.00 | $ | 12,957.81 |
| $Al_2O_3$ | 21,502.76 | $ | 400.00 | $ | 8,601.10 |
| $Mg(OH)_2$ | 8,971.33 | $ | 915.00 | $ | 8,208.77 |
| | | Total Value | | $ | 102,053.88 |

Selected Additional Outputs [REE]

| Chemical Symbol | Mass (g) | Value ($/g) | | Scaled Value | |
|---|---|---|---|---|---|
| U | 38,000.00 | $ | 8.12 | $ | 154,280.00 |
| Sc | 17,000.00 | $ | 8.95 | $ | 76,075.00 |
| Ir | 8,000.00 | $ | 9.37 | $ | 37,480.00 |
| Lu | 5,000.00 | $ | 8.50 | $ | 21,250.00 |
| Tb | 6,000.00 | $ | 3.65 | $ | 10,950.00 |
| | Total Material Costs | | | $ | 339,266.60 |

Fig. 15

Daily Operational Values

| | |
|---|---|
| Revenue | $ 434,000 |
| Cost | $ 77,000 |
| Gross Margin | $ 357,000 |

Enter Amount of Metric Tons per Day

Recalculate

Next

Back

Fig. 16

SYSTEMS AND METHODS FOR USING SMART CONTRACTS TO CONTROL THE TRADE, SUPPLY, MANUFACTURE, AND DISTRIBUTION OF COMMODITIES

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

RELATED FILINGS

This application is a Continuation of U.S. patent application Ser. No. 17/328,396, filed May 24, 2021, entitled Systems and Methods for Using Smart Contracts to Control the Trade, Supply, Manufacture, and Distribution of Commodities, which is a Continuation of U.S. patent application Ser. No. 15/675,697, filed Aug. 11, 2017, entitled Systems and Methods for Using Smart Contracts to Control the Trade, Supply, Manufacture, and Distribution of Commodities, which is a Continuation-In-Part of U.S. patent application Ser. No. 15/669,870, filed Aug. 4, 2017, entitled System and Method for Manufacturing and Trading Securities and Commodities, which claims priority to U.S. Provisional Patent Application No. 62/371,098, filed Aug. 4, 2016, entitled System and Method for Interconnectivity of Servers Within a Distributed Network, all of which are incorporated herein by reference in their entirety. U.S. patent application Ser. No. 15/675,697 also claims priority to U.S. Provisional Patent Application No. 62/373,839, filed Aug. 11, 2016, entitled Benefication of Metal Bearing Waste Streams and Conversion into Commercial Products, which is incorporated herein by reference in its entirety.

Due to the complexity and diversity of the topic it is necessary to disclose the enablement in a four-patent-application process, whereby the series of applications will be together incorporated by reference in their entirety.

TECHNICAL FIELD

The present principles are directed to systems and methods for providing a trading system cooperatively integrated with manufacturing control and distribution systems, and, more specifically, to provide a trading, clearance, settlement, and depository for securities, commodities, and their derivatives (collectively "securities") that utilize asset-backed, virtualized data tokens and blockchain technology to facilitate price discovery and automated transactions at all stages of the asset development, manufacturing, and distribution of commodities.

BACKGROUND

Disclosed herein are various embodiments of systems and methods for analyzing feasibility of a metals extraction process. The various embodiments disclosed are not intended as limitations, and may be combined or implemented individually, in part or in whole. The metals extraction process may be performed on any type of input source material containing metal including, but not limited to, coal fly ash, bottom ash, metal slurry, and any other ash, sand, contaminated soil, contaminated granular material, or combinations thereof. The method comprises calculations, display, and export of cost, process, effectiveness, and outputs, among others.

The method further comprises using a pre-programmed calculator which interprets user inputs and returns information such as, but not limited to, process flow sheets, the cost of materials needed, the heat required, pH at specified locations in the process, material values, and estimated costs and revenue analyses. The user may input information such as elements present in the input, desired outputs, quantities of inputs, quantities of outputs, extraction potential, efficiencies, assumptions, and the values of materials. Variables that may affect the process may vary depending on the input type and composition. The user may have the opportunity to choose pre-loaded input types or scenarios which may be loaded as-is or may be used as a starting point which the user may edit. Data may be pulled from various internal and or external databases.

So as to reduce the complexity and length of the Detailed Specification, Applicant(s) herein expressly incorporate(s) by reference all of the following materials identified in each paragraph below. The incorporated materials are not necessarily "prior art" and Applicant(s) expressly reserve(s) the right to swear behind any of the incorporated materials.

Applicant(s) believe(s) that the material incorporated above is "non-essential" in accordance with 37 CFR 1.57, because it is referred to for purposes of indicating the background or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the systems, methods, processes, and/or apparatuses disclosed herein. To the contrary, if the provisions of 35 U.S.C. § 112, ¶6 are sought to be invoked to define the embodiments, the claims will specifically and expressly state the exact phrases "means for" or "step for, and will also recite the word "function" (i.e., will state "means for performing the function of . . . "), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed embodiments, it is intended that the embodiments not be limited only to the specific structure, material or acts that are described in the preferred embodiments, but in addition, include any and all structures, materials or acts that perform the claimed function as described in alternative embodiments or forms, or that are well known present or later-developed, equivalent structures, material or acts for performing the claimed function.

It should be clear that the embodiments of the systems and methods disclosed herein are not inclusive but merely serve as examples of possible embodiments. The order of presentation of the embodiments does not imply order of preference. It should be clear that while each embodiment is discussed as a separate whole from the other embodiments that various aspects from any one or more embodiments may be combined to form other embodiments not explicitly disclosed herein.

BRIEF DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures.

FIG. 5 is an example embodiment of a software window for choosing input characterization.

FIG. 6 is an example embodiment of a software window for inputting fly ash composition.

FIG. 7 is an example embodiment of a software window for inputting trace metal compositions in the feedstock.

FIG. 8 is an example embodiment of a software window for choosing pre-treatment options for a fly ash feedstock.

FIG. 9 is an example embodiment of a software window for selecting process outputs.

FIG. 10 is an example embodiment of a software window for selecting form of process outputs.

FIG. 11 is an example embodiment of a software window for editing input values.

FIG. 12 is an example embodiment of a software window for editing output values.

FIG. 14 is an example embodiment of a software window for providing an economic analysis of process inputs.

FIG. 15 is an example embodiment of a software window for providing an economic analysis of process outputs.

FIG. 16 is an example embodiment of a software window for providing an overall economic analysis for a particular process.

Elements and acts in the figures are illustrated for simplicity and have not necessarily been rendered according to any particular sequence or embodiment.

DETAILED DESCRIPTION

In the following description, and for the purposes of explanation, numerous specific details, process durations, and/or specific formula values are set forth in order to provide a thorough understanding of the various aspects of exemplary embodiments. However, it will be understood by those skilled in the relevant arts, that the apparatus, systems, and methods herein may be practiced without these specific details, process durations, and/or specific formula values. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

Further, the following examples include illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Tokenization Process

Figure 1:
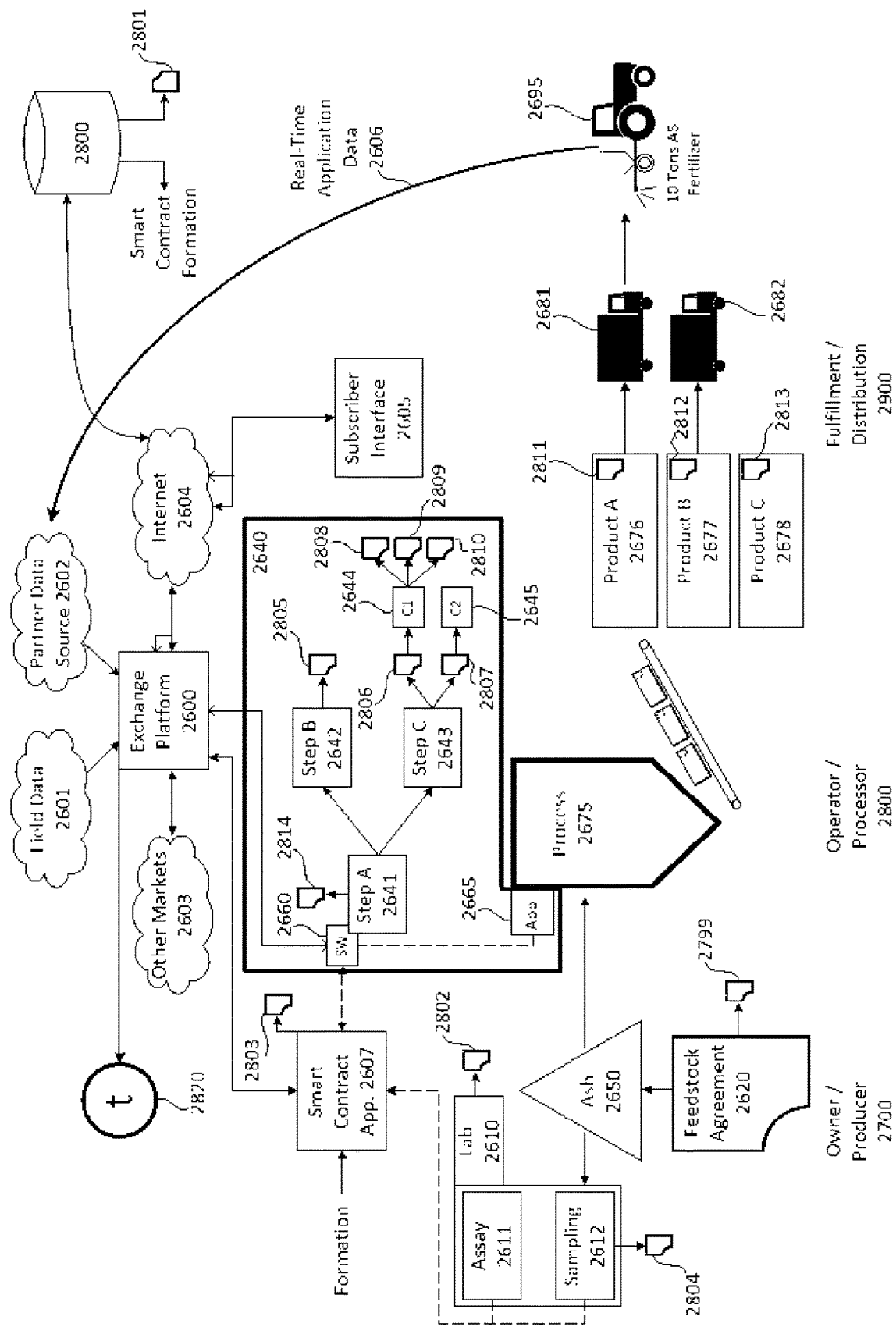
FIG. 1 depicts a process overview and how an exchange operates in harmony with plant process control for an exemplary metals extraction plant.

FIG. 1 depicts an overview of the systems, processes, and utility associated with the beneficiation of coal combustion products, including fly ash. 2700 represents the coal burning power plant industry, regardless of whether or not they are currently producing energy; they are or have produced a byproduct known as coal fly ash, or CFA. CFA is generally problematic and a signficant environmental liability. While the costs associated with placing CFA in a landfill on site can be significant, there may be other costs associated with its disposal. As such, CFA represents a significant cost center to power plant operators.

This application discloses a family of technologies and unique processes to identify, value, and extract various rare earth metals and minerals found in CFA, or other industrial wastes, such as oil well flow back water, ore tailings, acid mine drainage, metal smelting residues, and such, that can be manufactured into marketable intermediate products and commodities.

Field survey and literature review 2611 represents the geophysical, geospatial, and prior qualitative and quantitative information that may be obtained as part of defining the number of samples, their configuration, type, depth, extent, and target species for a particular fly ash inventory. This information may be captured in a hardcopy report, database, or other electronic media for use in developing a field-sampling plan.

Field-sampling plan 2612 may represent the nature and extent of a sampling effort, and may include the sample number, frequency, spacing, location, depth, sample handling, data logging, sample inspection, as well as parameters and steps to handle off-normal, out of specification, or unexpected conditions. This information may be captured in a hardcopy report, database, or other electronic media for use in selecting analytical methods and analytical sample preparation.

Analytical (Laboratory) process step 2610 represents instrumentation that may be used to interrogate the selected samples extracted from the field. A wide variety of analytical methods may be used to collect and organize data in the field or in a laboratory setting.

Data from the analytical methods and geotechnical investigation of Assay 2611 are used to calculate the inventory of target materials of a unit quantity of CFA, or the amount of portfolio of materials contained within a specific site. As part of the Assay 2611 process, a Site-Specific Mass-Volume Calculation is made and valued according to a market price for the sale of the metals. The data from the field survey and literature review and field-sampling results are synthesized into a site specific value with appropriate uncertainties for use in calculating a variety of project-specific variables. These variables may include, but are not limited to, equipment selection, site preparation and sequencing, processing duration, total site mass or volume. These bases may provide different potential uses or perspectives with respect to business logic and process engineering decisions. And are documented in a ledger entry 2799 along with the valuation 2802. This process steps as depicted in processes 2799, 2801, 2802, 2803, 2814, and and the like, represent process interactions with a distributed ledger 2800. Data from the analytical methods are used to quantify the target constituents of interest at specific levels of resolution that may be dictated from detection limits or economic interests. Speciation may be elemental, mineralogical, or chemical and may be reported in a variety of logically consistent units (e.g. parts per million, parts per billion, weight percent, etc.). These data elements may be preserved on for use in a Smart Contract or process control feature 2607.

Inventory-Valuation Estimate 2803 from the analytical methods, site-specific mass-volume calculation, and external economic data from the commodities markets may be used to calculate the value of a unit volume of fly ash or the value of a fly ash deposit (in part or in its entirety). This information may be used in developing elements of the Blockchain and Smart Contract associated with this fly ash deposit.

Site Scope Definition 2804 from geotechnical investigation that may be used to define the scope of a particular fly ash deposit. This information may be captured in a hardcopy report, database, or other electronic media for use in developing total site mass or volume. These data may be preserved on an Ethereum or other Blockchain technology for use in a Smart Contract 2607, or process control feature 2640. Producers and owners of stockpiled fly ash engage in a "feedstock agreement" 2620 encompassing the producers/owners commitment to subscribe to the exchange 2600 allowing release of feedstock for subsequent processing and sale of products.

A subscription allows the subscriber to move fly ash from their storage facilities to process 2675 for producing a portfolio of valuable mineral products, including but not limited to rare earth metals, fertilizer, and various industrial chemicals. This subscription begins the process of eventual liquidation.

After the subscription agreement 2620 is established between registrant and an owner or producer of fly ash, the fly ash may be stockpiled 2650 at either the registrant's facility or left in place at the owner's site for eventual extraction. Each individual shipment, or allotment, of fly ash can be logged into a distributed ledger 2650. A hash code 2660 may represent a specific shipment/allotment and may track the shipment through the procurement process.

In order to quantify the composition of individual shipments/allotments stored within 2650, each shipment/allotment may be randomly sampled and analyzed. The resulting analysis is an inventory of the minerals and metals found within the fly ash. The ledger holding the hash code representing an individual shipment/allotment may be amended to include a relative composition. A random sample 2612 of fly ash is sent to a lab 2610 for analysis to determine the shipment's/allotment's value in the form of an assay 2611. The assay results may be correlated to the spot rate of the commodities contained therein.

The processes 2675 may be predicated on the use of one or more Smart Contracts. Smart Contracts are computer protocols intended to facilitate, verify, or enforce the negotiation or performance of a contract. Many contractual clauses may be made partially or fully self-executing, self-enforcing, or both. The aim with Smart Contracts is to provide security and traceability that is superior to traditional contract law and to reduce other transaction costs associated with contracting.

Smart Contracts 2607 have been used primarily in association with cryptocurrencies. The most prominent Smart Contract implementation is the Ethereum Blockchain platform. Once the composition of the fly ash is determined, a Smart Contract system 2607 logs the value of the commodities based on the spot rate of the commodity composed therein. The Smart Contract architecture can also incorporate specific contract direction that a subscriber may dictate as part of an order.

Spot rates may be used to price the shipment of commodities associated with the fly ash. A value representing the shipment's specific value is amended to the shipment's hash code stored within the distributed ledger 2660.

The embodiment of the process of receiving an input of fly ash 2675 and outputting a tradeable commodity 2644, logged with a hash code; where the Hash code is the same as a hash function. A hash function is any function that can be used to map data of arbitrary size to data of fixed size. The values returned by a hash function are called hash values, hash codes, digests, or simply hashes. One use is a data structure called a hash table, widely used in computer software for rapid data lookup. Hash functions accelerate table or database lookup by detecting duplicated records in a large file.

The stockpiled fly ash 2650 is sent to process stage 2675; the approaches and processes for extracting commodities from fly ash may be contained in the first CIP and co-pending application following this application and covered in much greater detail. An appliance 2665 is collocated with the process control system of 2675 in order to control and manage the global supply chain of the fly ash through the chemical and physical processes of extraction, generally 2640 through 2676.

Further, 2665 facilitates the methods used to track the material for continue updating into the ledger within each stage to transactional change. The appliance adjusts the location value associated with the hash code 2660 representing a shipment of fly ash. The appliance also has the ability to label the outputs from the process as unique 2642, 2643, 2644, and 2645. The entire supply chain is embodied therein. The supply chain is further defined as the process of process control, distribution of product, distribution of regents, and executing the chain of custody of the product.

2640 is an embodiment of the chemical and physical processes for the procurement of commodities and rare earth metals from fly ash. The processes contained within 2641, 2642, 2643, 2644, 2645, 2660 are the various steps within the process. Shipments of the fly ash are input into the system. Tracked by a hash code associated with 2660, the shipments move through the processes 2641, 2642, 2643 and are turned into commodities and rare earth metals. At the end of the processes, the commodities and rare earth metals produced are given unique hash codes 2644, 2645. The hash codes are used as representation of the items on the exchange platform 2600. The hash codes are amended to the ledger creating the tradeable commodity.

A process is described for converting a shipment of fly ash to commodities and rare earth metals. Other processes described within the process 2641 may be controlled via a Smart Contract 2660. The Smart Contract object 2660 is driven by data received from the Smart Contract appliance 2665, and the various data inputs from the exchange platform 2600 and provides various process control inputs associated with, but not limited to, the optimal pumping rate, stir rate, mixture ratios, amounts, and volume to maximize efficiency of processing system 2675.

Receiving the output from process 2641, an option is to store the resulting products. Process intermediates may also be stockpiled for future use in process 2643.

Contaminants may be removed to create purified products which may be distributed to steps 2642 and 2643 improving the efficiency of extracting rare earth metals. The whole process is logged continuously by an appliance or appliances FIG. 1, 2665 monitoring the supply chain.

In the event that the process intermediate is received by 2641 is not decided for storage 2642, the product may enter the procurement process. Through a proprietary chemical leaching solution, the product entered into this stage is transformed into rare earth metals. There are two outputs from this process: rare earth metals 2644 and an excess product 2645 that has the opportunity for future refinement but no immediate value. The excess product in 2646 may be moved to a similar storage facility as the product given to 2642.

Rare earth metals extracted from the chemical leaching solution 2643 are each assigned a new unique hash code. These hash codes are used to liquidize these commodities on a proprietary exchange 2600. The commodities created 2676, 2677, 2678 are shipped to their final destinations through the use of various supply chain fulfillment methods 2691, 2682. The excess product created is moved to a storage area 2642 with the potential for later refinement.

The Smart Contract application 2607 receives data from the exchange platform 2600 and acts as a guide for the exact specifications of production outlined in the embodiment included with the process control 2640, 2665. The Smart Contract application also creates tradeable derivatives that are based on the rare earth metal commodity outputs 2644 from the refinement process 2643.

In an embodiment of exchange platform 2600, it may operate and fluidly maintain a distributed network through a plurality of micro networks amongst its users. The micro networks may operate transactions within a small number of users. This increases the speed and efficiency of the exchange network. At predetermined time intervals, each user may send their most up to date chain of transactions representing the net change in assets over the time-period to a centralized exchange for compilation and the other networks of users. The centralized exchange may document and store the complete ledger in order to mitigate the threat of fraudulent transactions. The exact specifications and definition of the transactions are defined therein. The system may be peer-to-peer and transactions can take place between users directly, without an intermediary. These transactions may be verified by network nodes and recorded in a distributed ledger that houses hash codes representing the commodity. When a transaction is made between two parties, a block in the ledger is updated when two or more entities not involved in the transaction authenticate a trade. Once a trade is authenticated, an object (currency, stock, etc.) changes ownership. This negates the need for a physical transferable object.

Market participants may subscribe to the exchange platform 2600 in order to trade commodities.

Figure 2:
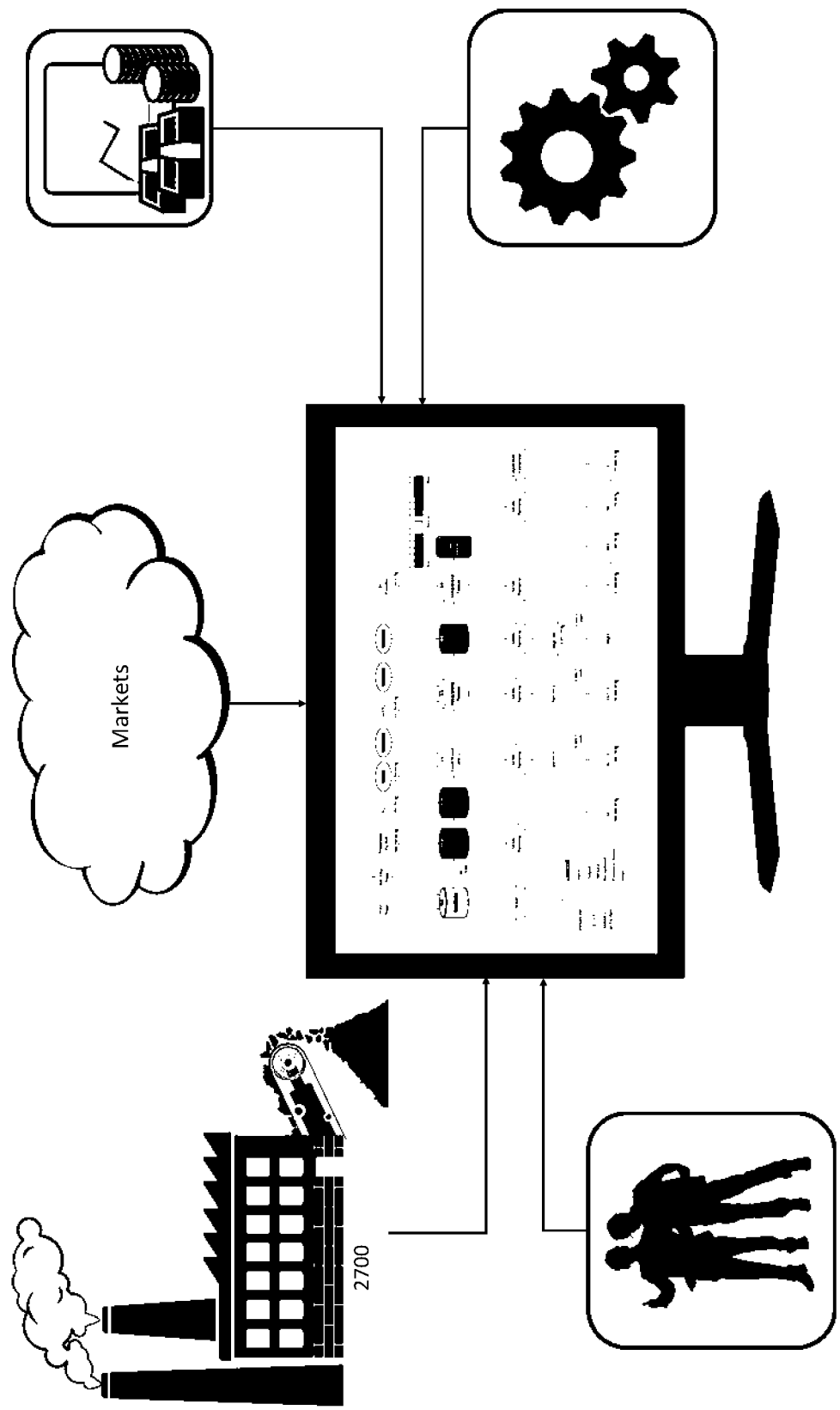
FIG. 2 depicts an embodiment of a tokenization process as it relates to a product.

In a non-limiting example of an asset-backed tokenization process, FIG. 2 depicts block 2800 as a distributed database record storing what are called distributed ledgers 2801. Distributed ledgers are a collective database that is consensually shared and synchronized between a network of nodes across multiple locations, and may operate in either private mode, public mode, or a combination thereof. In private, mode, the distributed ledgers 2800 is owned and maintained for the exclusive benefit of the owners or members of a specific exchange. This mode ensures private data is secure from public access. In public mode, the distributed ledgers are available for registration and recording of transactions and other data by the public at large. In hybrid mode, one or more distributed ledgers operating in private mode may bridge, or publish subsets of data entries to either one, or both distributed ledgers operating exclusively in private or public mode. Private, public, or hybrid distributed ledgers 2800 may be created upon the initial creation and registration of an asset-backed token. Asset-backed tokens may represent any measurable, quantifiable, and verifiable physical, or economic characteristics. Asset-backed token characteristics may include but are not limited to the volume, mass, value contribution ratio, current market value, elemental makeup, mineral species, grading data, location of origin, or processing facility data of the specified underlying assets. In another non-limiting example, feedstock agreements may be originated, or created at $T_1$ and documented, or registered in a datagram 2799. Datagrams 2799 may then be transmitted to one or more exchanges 2600 and recorded into one or more distributed ledgers 2800. Once created, a ledger may publish a posting to one or more distributed ledgers 2800 operating in public, private or hybrid mode. This posting, along with every subsequent datagram entry and posting establishes what is known in the art as a Blockchain for each registered asset-backed token. As assets have value, such value may be unknown, or undetermined at this point. At $T_2$, a commodity inventory may be evaluated using data and algorithms in steps 2610, 2611, 2613, 2802, and 2804. In a non-limiting example of a mineral bearing asset, the results of standard sampling, and assay process may be documented at 2803. The results of each data acquisition, calculation, and recording step may be transmitted to an exchange server relating to a specific ledger entry. The results may then be published to the distributed ledger 2800 and added as a new entry to the Blockchain, each entry may represent a value change in the process of the underlying commodity, such as in this example of a mineral bearing substance.

At some point in the life-cycle of an asset, a commodity may be designated to fulfil a supply contract between the owner of an asset, to one or more buyers, or traders of the asset, or of one or more underlying commodities. The contractual terms to fulfill such an agreement may be automatically created and transacted using a Smart Contract. Any one or more variables or events may be defined to cause the creation, and the automatic clearing or execution of Smart Contracts. Smart Contracts may be created and cleared using milestones that may be achieved throughout the lifecycle of an asset, collection of assets, a process, or series of processes. Smart Contracts may be managed by the owner of an exchange, as part of the exchange services; where fees for such transactions are paid directly to the exchange. Transactions created in the above process are entered into the distributed ledger 2800 and may be logged in a public mode, private mode, or to both, the determination of which may depend on the type of record, contract, asset, an aspect of the transaction, subscription service level, or membership level.

As discussed earlier, a Smart Contract 2607 may execute certain tasks automatically. Non-limiting examples where a Smart Contract may automatically execute may be once a buy signal is released based on a buyer, a notification is sent and received by a Smart Contract. The Smart Contract then initiates process 2675 whereby raw materials are processed per one or more ledgers records, i.e., gold, platinum, or bananas into banana bread. In this example, the overlying process control may be functionally indistinguishable from the execution logic of the Smart Contract.

In an embodiment, the Smart Contract 2607 may send an authorization signal to a plant control processor 2640 running in an appliance 2665. Depending on the received authorization signal, logic software 2660 may accept the instruction as a process control signal, and may initiate, delay, stop or alter one or more controlled plant processes. Acceptance of a process control signal and subsequent execution to process material represents a one-way event; as once raw material is fed into the process, the raw feed is irreversibly altered into an intermediate state or final product. An example of this underlying process is analogous to processing cattle into beef products. Once a cow enters a processing plant, the process is committed and it is irreversible.

Steps 2641, 2642, 2643 each generate a data record of the process, these records as with the others are fed back out of the plant to the plant control system, and logged into a distributed ledger 2800 as a new record. Each phase of a process from start to finish may, or may not affect a change of value of the asset-backed tokens, or the underlying constituents. Only the defined terms and conditions of a Smart Contract may affect their value.

Eventually, an intermediate product or refined commodity is packaged, labeled and shipped. As an example, Product A could be sand in the form of silicon dioxide, Product B 2677 could be iron, and Product C 2678 could be gold. A Smart Contract pertaining to each intermediate or refined product may be individually, or collectively reported back to the ledger as a process event. In the case where a finished product is formed, an updated value from the Smart Contract may reflect in the record e.g. 2811, 2812, 2813.

In a final step 2900 fulfillment and distribution, the Smart Contract 2607 may include instructions to release funds upon shipment of the products F.O.B. the shipping dock. In this example, the asset owner, and all the way down to the plant owner may be paid for supplying and fulfilling the terms of the Smart Contract. The token is terminated and funds are disbursed per the Smart Contract. The Smart Contract may include other agreements for third-party services such as trucking agreements. For example, compensation for 2681 and 2682 transportation may be paid, as well. At the conclusion of this step, the buyer, or end user may take possession of, or consume the product or service, and may provide a consummation report back to the exchange through a partner database. This action may be the terminating step for one or more asset-backed tokens, or a pertinent Smart Contract. As consumers demand and buy more products, this process cycle is repeated, new Smart Contracts are created and executed, and additional raw material is processed into products.

In some embodiments of the Tokenization process, e.g. liquidity process; each process step e.g. FIG. 1, 2799, 2802, 2803, etc. may be used to establish the ledger record stored in FIG. 1, 2800 as 2801. The distributed ledger documents the process as described above, but in an alternate embodiment the process of Tokenization may include tokens that have different values and costs associated with them. This embodiment is supportive where multiple scenarios can occur.

In an embodiment, the Feed stock is 1,000,000 tonnes of Coal Fly Ash, and is documented in an agreement 2620, the agreement is in the form of a mineral rights agreement. A sampling plan and assay are initiated 2611 and 2612 that yield a total amount of material per tonne of material processed. Using the process totals disclosed below, and referring to FIGS. 4-15; FIG. 16 depicts a revenue value of 434 units per tonne of coal fly ash produced. The cost is shown as 77 units leaving a gross margin of 357 units. Processing 1000 tonnes of material per day yields a gross margin of 357,000 units. The mineral rights agreement allows processing of 1,000,000 tonnes, at 357,000 units per tonne for a total value of 357,000,000 units.

In some embodiments, one may choose to monetize their rights across a distributed exchange based on Block chain validation and verification kept in a distributed ledger. The distributed ledger uses the creation of a Token for every 1,000 units. The mineral rights agreement as assessed by a qualified $3^{rd}$ party as having a net present value of 10% post processing values gross market value or 357,000 units. The rights are placed on the exchange, the tokens are created representing the asset and the net present value of the asset. One side note here, obviously it is well understood in the art that futures markets may influence current values of assets, e.g. gold futures, silver futures and platinum futures. So obviously the asset values can be based on the asset, they could be based on a currency, or backed by digital currencies. For some embodiments, the term asset backed tokens is used, where the token has an objective value, similar to what the US dollars when backed by gold and later silver.

Another aspect, it that the values of the token can change based on the market values, or the token values are stable, and the quantities of tokens change. As an example, the minerals rights are based on a steady number based on the demands of the world economy, much like currency. However, the asset grows in value, so more tokens are created. As an example of that, FIG. 1 shows the steps of 2799, 2804, 2802, and the generation of a token 2820 through the exchange platform 2600. This process step is called for by a Smart Contract disclosed earlier and executed. The value doubles, therefore the number of tokens double, think of the token as a dollar. However, the token may be initially based on an assayed value, e.g., net present value, which places it under the market price, but the process step causes the value to double.

Referring to the example where the token is much like a dollar, at the end of a process 2675, the products, A-C 2676-2778 and FOB, at this point the tokens are dispersed, everybody is liquidated in the sale of the asset, the tokens are liquidated, and destroyed. The ledger and block chain are closed.

Below is a further discussion of a process tool, the process tool disclosed is linked to the assay and to the plant control processes FIG. 1 2640, processing decisions may be driven by futures, location of source material, market demand. The combination of the process tool, and token values play into the processing strategy, either automatically and dynamically, or manually. As an example, process step C can generate one of two product streams, C1 2644 or C2 2645. C1 has immediate need in the market, the price is up, and futures are strong. However, C2 is held either in the process step, or processed to product and stored waiting for the better time to liquidate through a sale of the asset. It is also well understood and practiced the art of longing and shorting the markets, it will not be further disclosed as it is well known and understood in the art.

The combination of plant process control, dynamic product evaluation in a processing assessment tool, and a digital exchange allows the formation of new economies based on currencies backed by assets. The combination of these three elements would not be well understood in the art.

Process Tool

Users may create a new analysis from scratch or based on a template using new material, quantity, and cost information, or to open an existing analysis or pre-loaded scenario. The user may preset units in preferences or may individually choose units for each analysis. The user may have the ability to edit the units used in an analysis at any time. The user may choose to display more than one-unit type for each value, for instance showing economic data in US dollars, yuan, and in euros and or showing masses in both kilograms and tons.

Depending on user preferences, the background calculations and analysis may be performed and updated every time a user input is provided/edited, when units are edited, at pre-defined time intervals, upon saving/exporting the analysis, or upon manual selection by the user.

When creating a new analysis, users may be offered various potential inputs as a starting point. If the user selects one of these, such as fly ash in an embodiment, the system may load a pre-filled set of variables that may or may not be editable based on user preferences. User preferences may be updated at any time throughout the analysis. Alternatively, the user may be presented with a list of the standard known components of the selected input which they may fill in and edit. If the user does not choose a preset they may be presented with an option to manually input the composition or load it from an external file such as an excel document. Users may provide the composition of the input material in terms of either mass or percent of total mass, or as set in user preferences. At any time, the user may navigate back to a previously presented screen to edit inputs. In some embodiments, the input variables may be requested in sequential windows which the user may progress through. In some embodiments, the user may manually choose which inputs are edited and when by selecting from a pane or list which may be included as part of the user interface. The user may scale the input and apply a unit such as 1000 tons per day or just 1 ton.

A selection of metals may be provided to the user from which the user may choose which outputs they desire. The user may add unlisted outputs. Depending on the input characterization different potential outputs may be listed. The input characterization may automatically be analyzed and potential outputs and variations thereof may be presented to the user for selection based on information stored within the program. Additional information may be loaded into the program at any time and or the program may automatically learn from the user or other sources. For some process embodiments, there may be alternative outputs that may be selected. In some embodiments, more than one alternative output may be selected with the opportunity to add desired percentages of each output. The user may have an opportunity to select the desired output compositions. A prompt may be presented to the user should the user attempt to add a desired output that is not feasible given the provided inputs. The system may employ built-in checks to alert the user should a specific value or data set fail to fall within certain parameters, for instance if the total composition of the input by weight percent fails to equal 100%. The parameters may be edited or provided with ranges for error such as 100% +/−2% may be allowable for the input weight percent parameter.

The user may select equipment for the process. The user may generally select type of equipment such as grinder, tank, or filter or may select specific equipment from specific manufacturers. The program may have access to database(s) of equipment which may update over time, depending on user preferences. The user may add equipment that is not currently in the system database(s) and may choose to add it to only a specific analysis and or to the database(s). The user may edit databases manually. Alternatively, depending on user preferences, databases may be locked for editing. Databases may be selected to update in real-time, for instance materials values may be selected to update in real-time based on commodity market values.

The user has the ability to scale the depth of the analysis. For instance, the user may simplify the analysis by choosing not to include specific equipment that may be utilized or the user may choose to set one or more assumptions that reduce the number of calculations required in the analysis, such as assuming global process efficiency of 100%. Alternatively, the user may increase the depth of the analysis by providing more information such as individual process and/or equipment efficiencies.

The user may provide notes around any input, output, process, equipment, etc. that may be selected to be shown on the final output or may be viewable only to the user.

Figure 3:
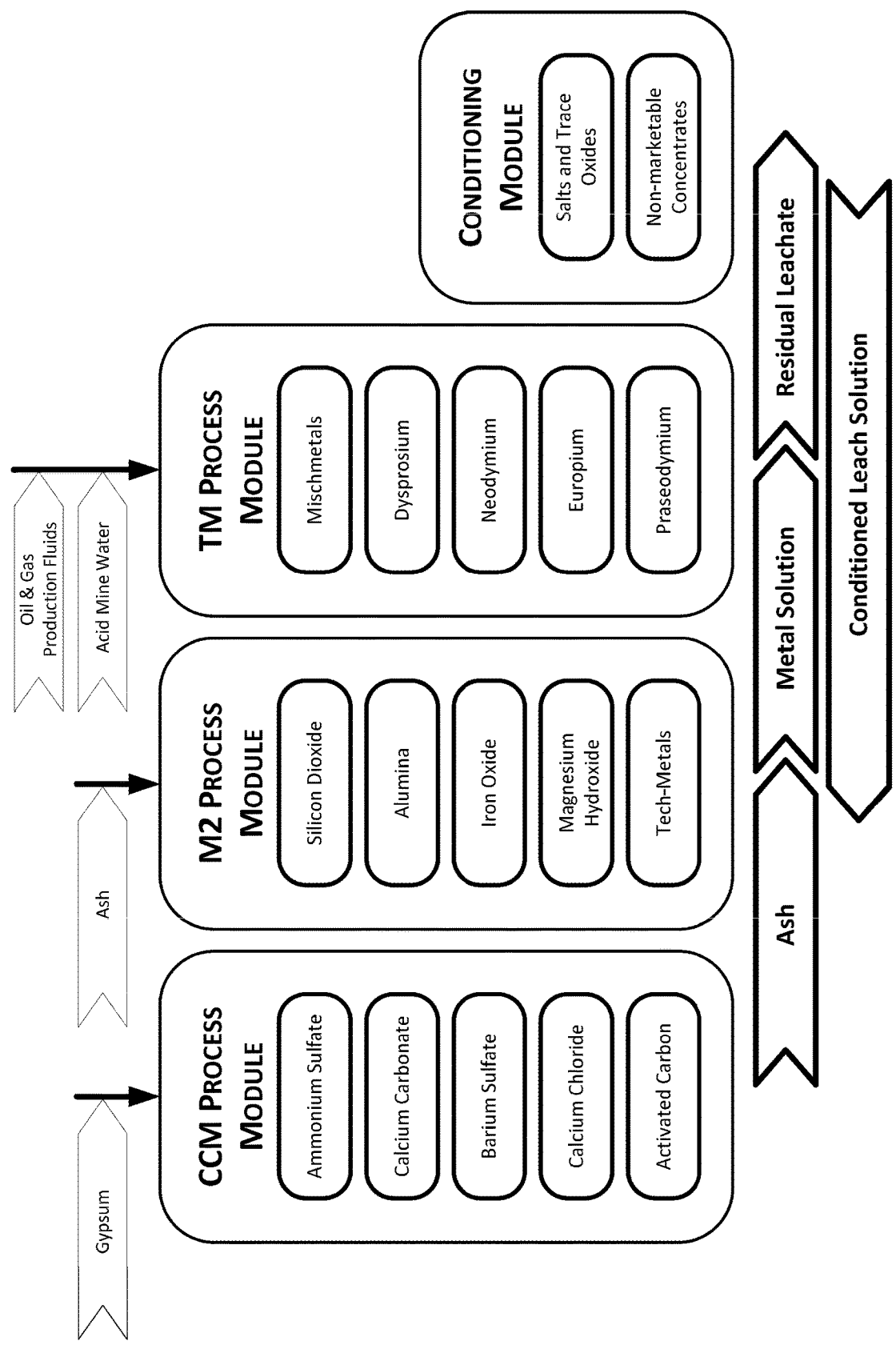
FIG. 3 is a block diagram depicting an exemplary embodiment of a process breakdown for an ash conversion plant.

FIG. 3 is a block diagram depicting an exemplary embodiment of a process breakdown for an ash conversion plant. In the depicted embodiment, the conversion process is broken down into three processes followed by a conditioning process. The first process module is a Compound Commodities Module (CCM) for converting gypsum, if present, into one or more of ammonium sulfate, calcium carbonate, barium sulfate, calcium chloride, and activated carbon. The second process module is a Metals Module (M2) for extracting various metals such as alumina and iron oxide. In some embodiments, silicon dioxide may be extracted in the M2 modules. The third process module is the Tech-Metals Module (TM) for the extraction of various metals such as rare earth metals and mischmetals. The Conditioning Module is for the final extraction of unmarketable concentrates and for conditioning the remaining leachate and/or water for reuse.

Figure 4:
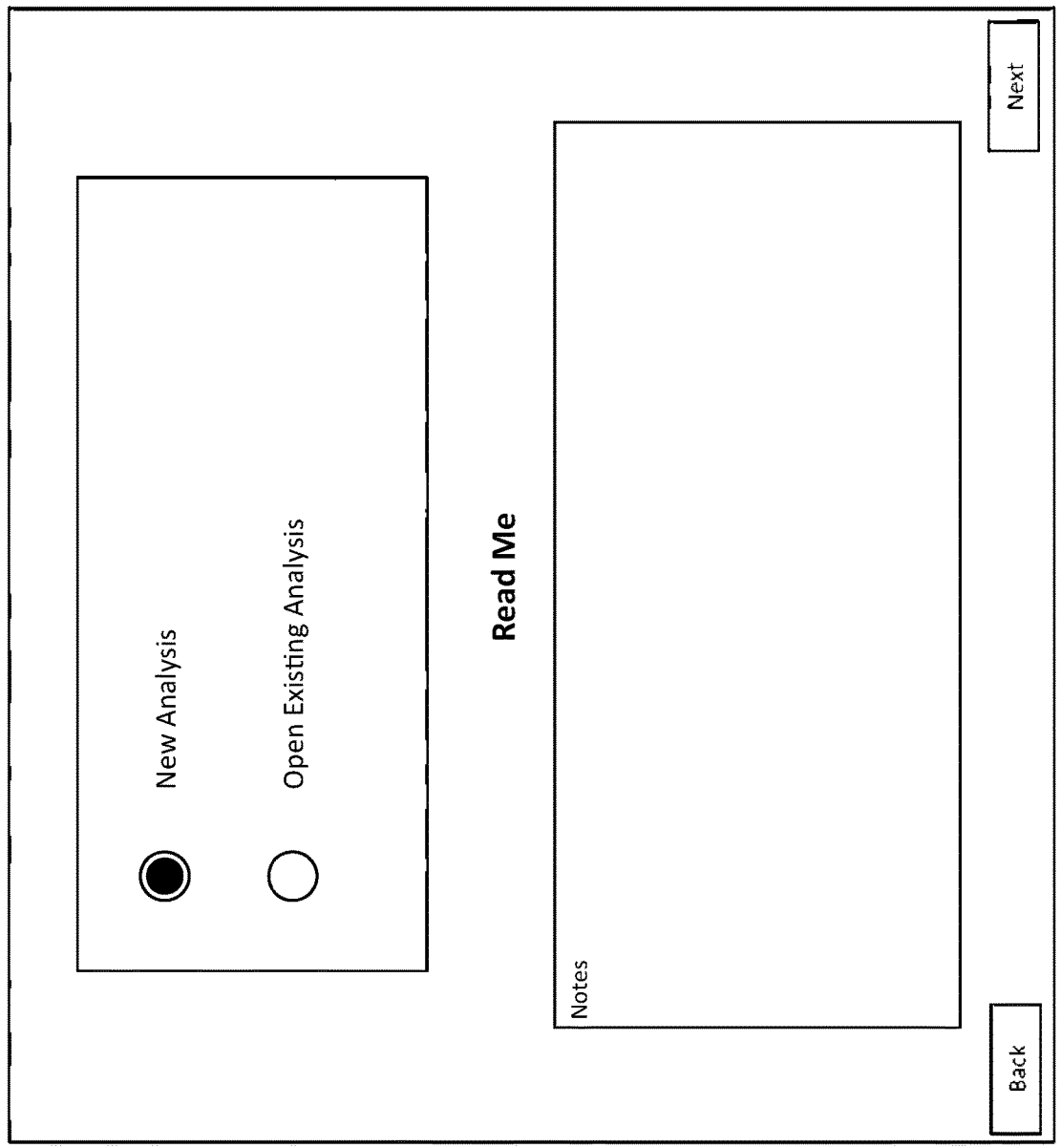
FIG. 4 is an example embodiment of a software window for beginning an analysis.

FIG. 4 is an example embodiment of a software window for beginning an analysis. The plant processing scenario tool provides a method to conduct "what-if" types of economic calculations, regression modeling of plant performance and product yields, or other types of optimizations or forecasting. The launch into this application provides a dialog that allows the user to select previously developed scenarios or create new scenarios with various inputs and assumptions. This dialog also enumerates the default inputs and assumptions for the user in the absence any other direction.

FIG. 5 is an example embodiment of a software window for choosing input characterization. This dialog in the process tool application provides for specifying a substrate for process simulation and preserving user notes as a simulation evolves. CFA is the default selection, however, other substrates are prospects for processing through an Elixsys-based separation plant. The proposed separation methods are highly modular and capable of adapting to feeds with wide ranging properties.

FIG. 6 is an example embodiment of a software window for inputting fly ash composition. This dialog in the process tool application provides a method for inputting a specific substrate (CFA or other material) composition on a unit basis. The radio buttons extend the composition definition protocol to include materials that may be minor contributors in overall quantity, but represent high-value opportunities. An auto-loading script that can extract data from a machine-readable file may represent a preferred embodiment of this interface.

Figure 7:
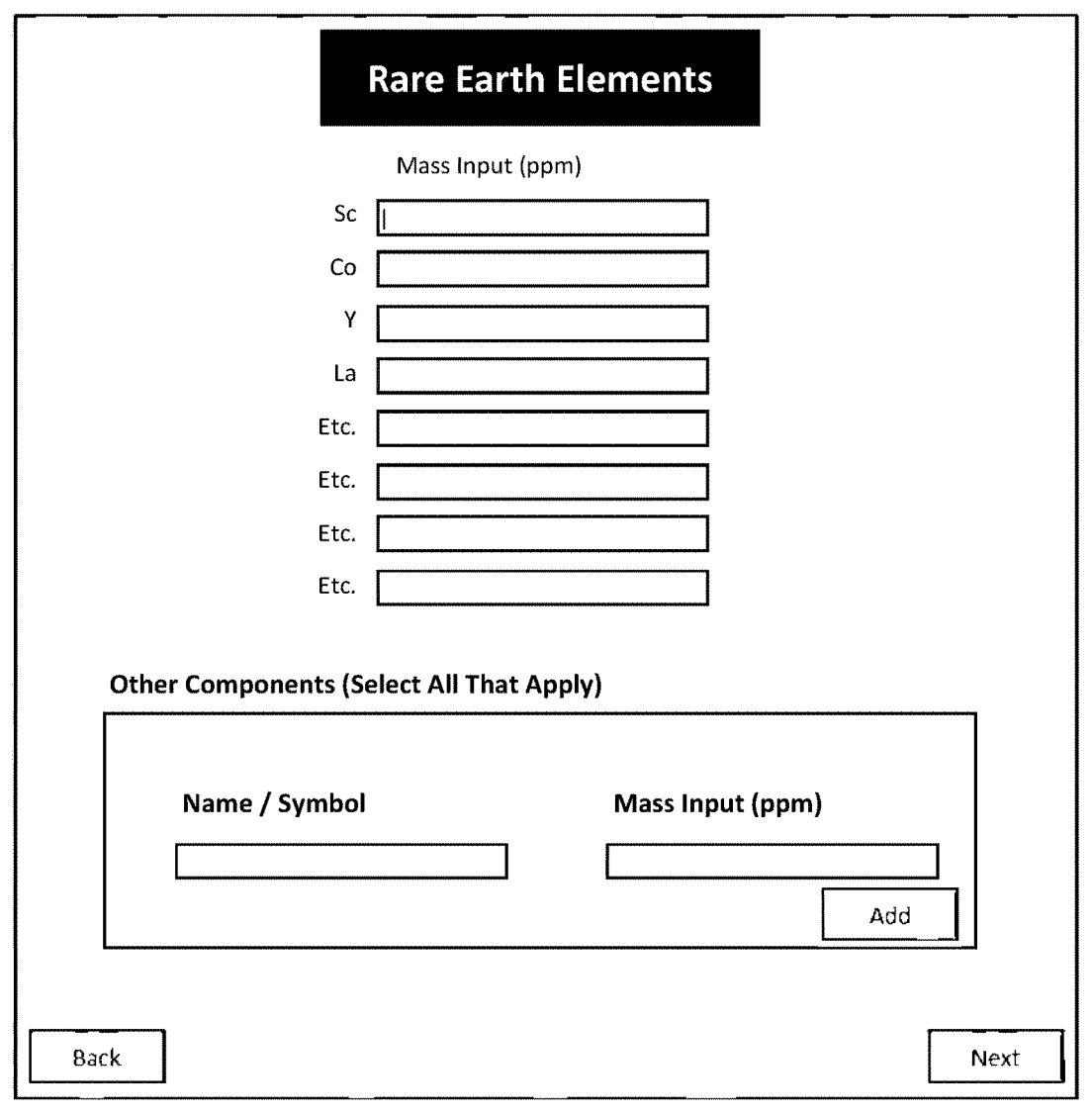

FIG. 7 is an example embodiment of a software window for inputting trace metal compositions in the feedstock. This dialog represents an embodiment of the radio button action from Page_10; it allows specific user input for species that may not have been captured in a machine-readable file as part of a routine characterization assay.

FIG. 8 is an example embodiment of a software window for choosing pre-treatment options for a fly ash feedstock. This dialog interface represents a simplified decision selection for the fly ash pretreatment circuit in a simulation. There are distinct options identified for extraction in the pretreatment circuit, with ammonium sulfate-calcite production, barium sulfate-calcium chloride production, and gypsum recovery as initial separations. Other conversions and recoveries may be discovered and incorporated as experience dictates.

Figure 9:
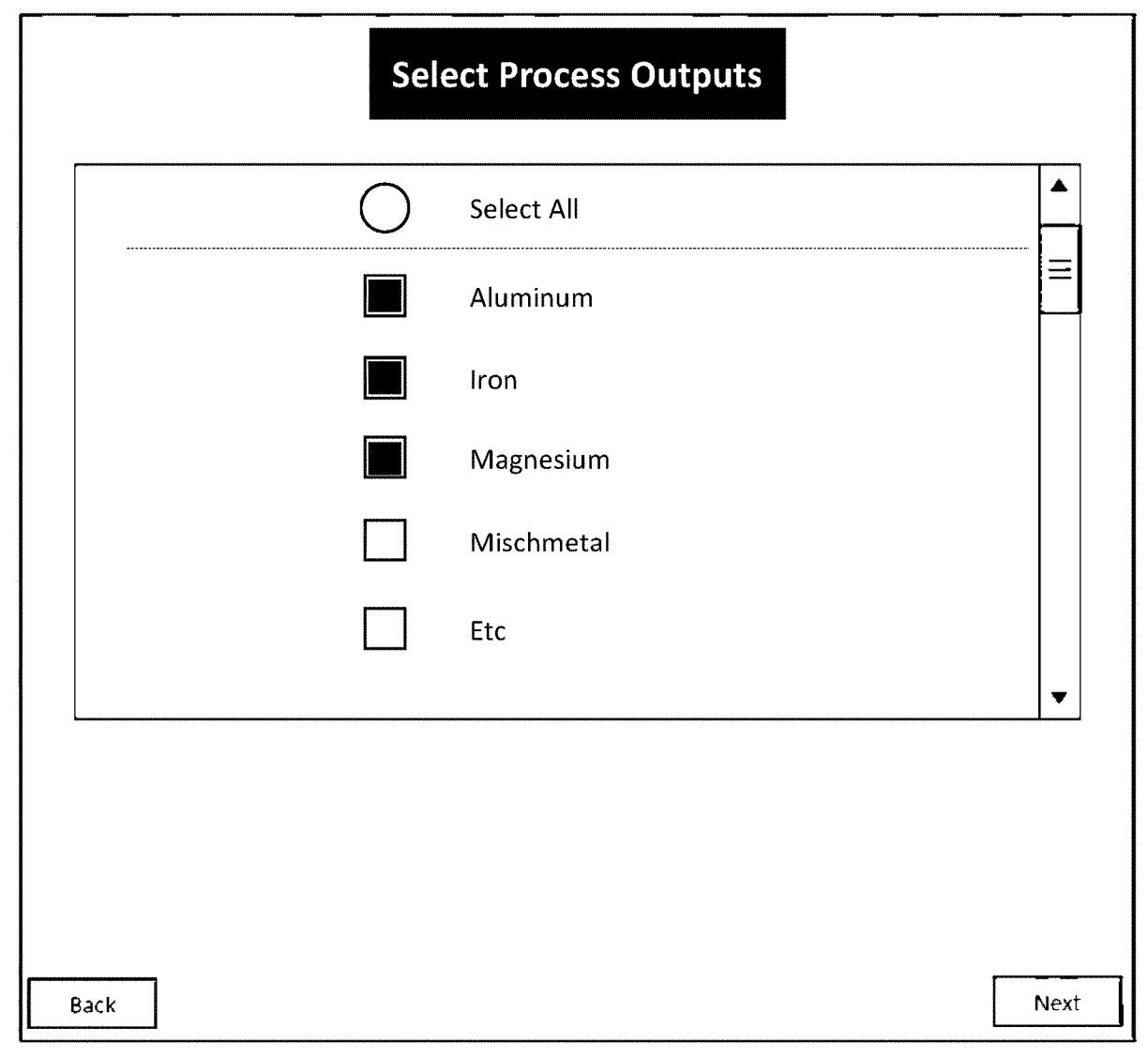

FIG. 9 is an example embodiment of a software window for selecting process outputs. FIG. 10 is an example embodiment of a software window for selecting form of process outputs. These dialog interfaces represent a decision selection for the industrial materials recovery circuit post-pretreatment in a simulation. There are distinct options identified for extraction in the industrial materials circuit, with aluminum (as aluminum oxide) production, iron (as iron oxide), and magnesium (as magnesium oxide) recovery as initial separations. Other conversions and recoveries, such as mischmetal and silicon dioxide may be incorporated as economics and experience dictates.

FIG. 11 is an example embodiment of a software window for editing input values. This dialog interface provides a means for defining consumable input processing costs. These costs may be input by the user or extracted from a live data feed from spot/futures market data for use in the simulation. The bases for the input ranges may be statistically-based and/or consider quotes from a variety of suppliers.

FIG. 12 is an example embodiment of a software window for editing output values. This dialog interface provides a means for defining output product prices. These prices may be input by the user (as a what-if condition) or extracted from a live data feed from spot/futures market data for use in the simulation. The bases for the input ranges may be statistically-based and/or consider quotes from a variety of suppliers.

Figure 13:
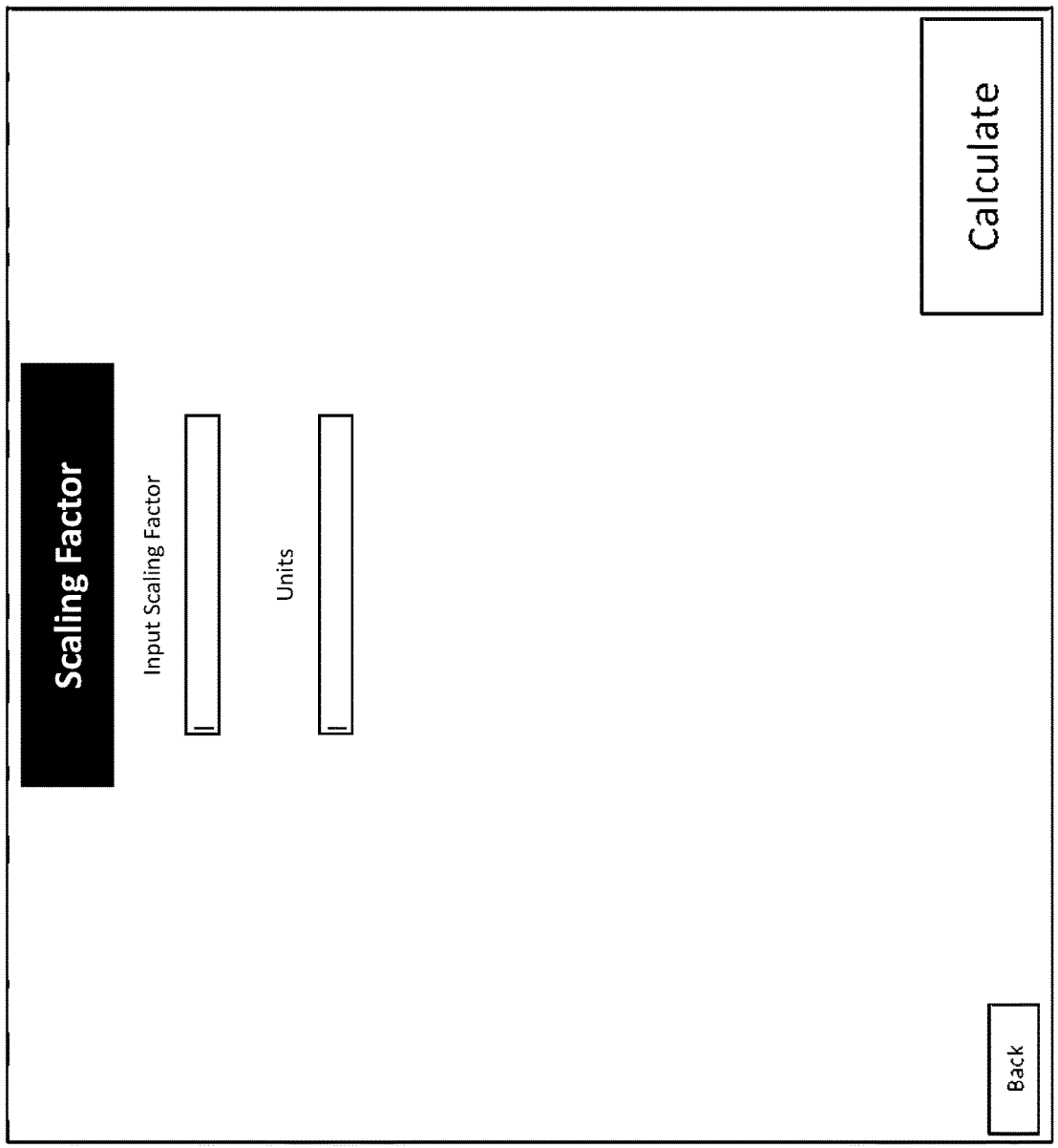
FIG. 13 is an example embodiment of a software window for choosing a scaling factor, or tonnage.

FIG. 13 is an example embodiment of a software window for choosing a scaling factor. This dialog allows a user to quickly and easily scale the mass flow and economic results by a specific scaling factor.

FIG. 14 is an example embodiment of a software window for providing an economic analysis of process inputs. This dialog provides the output of an economic simulation in a dashboard format, where a user can review the input production quantities and their associated costs with respect to plant operations on a unit basis (ton of CFA).

FIG. 15 is an example embodiment of a software window for providing an economic analysis of process outputs. This dialog provides the output of an economic simulation in a dashboard format, where a user can review the output production quantities and their associated prices with respect to plant operations on a unit basis (ton of CFA). Minor, high-value constituents may be priced with respect to a more rational basis after extraction from the CFA, rather than per ton of CFA processed.

FIG. 16 is an example embodiment of a software window for providing an overall economic analysis for a specific process. This dialog interface provides a means for defining the economic balance of plant calculation on a unit basis (typically, ton of CFA processed). The inputs, outputs, costs, and prices may be modified by the user in the simulation (as a what-if condition).

Figure 17:
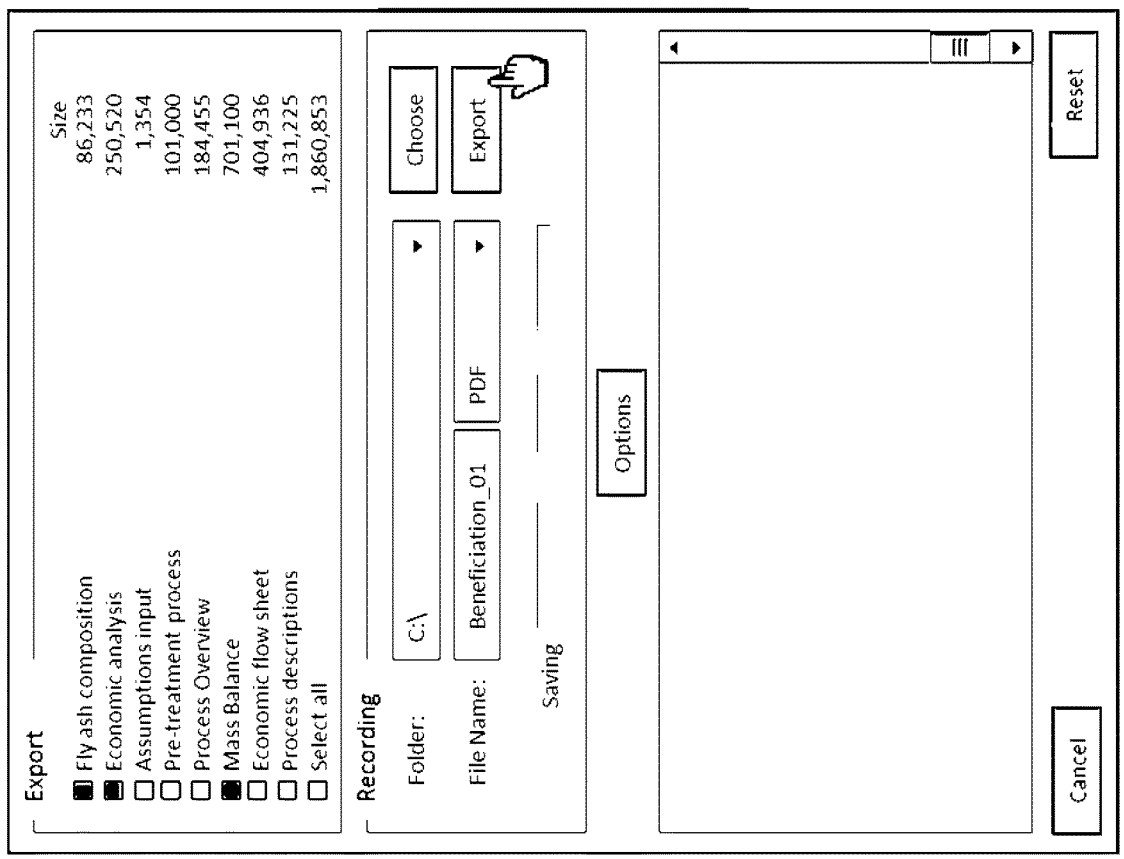
FIG. 17 is an example embodiment of a software window for exporting process analysis results.
Figure 18:
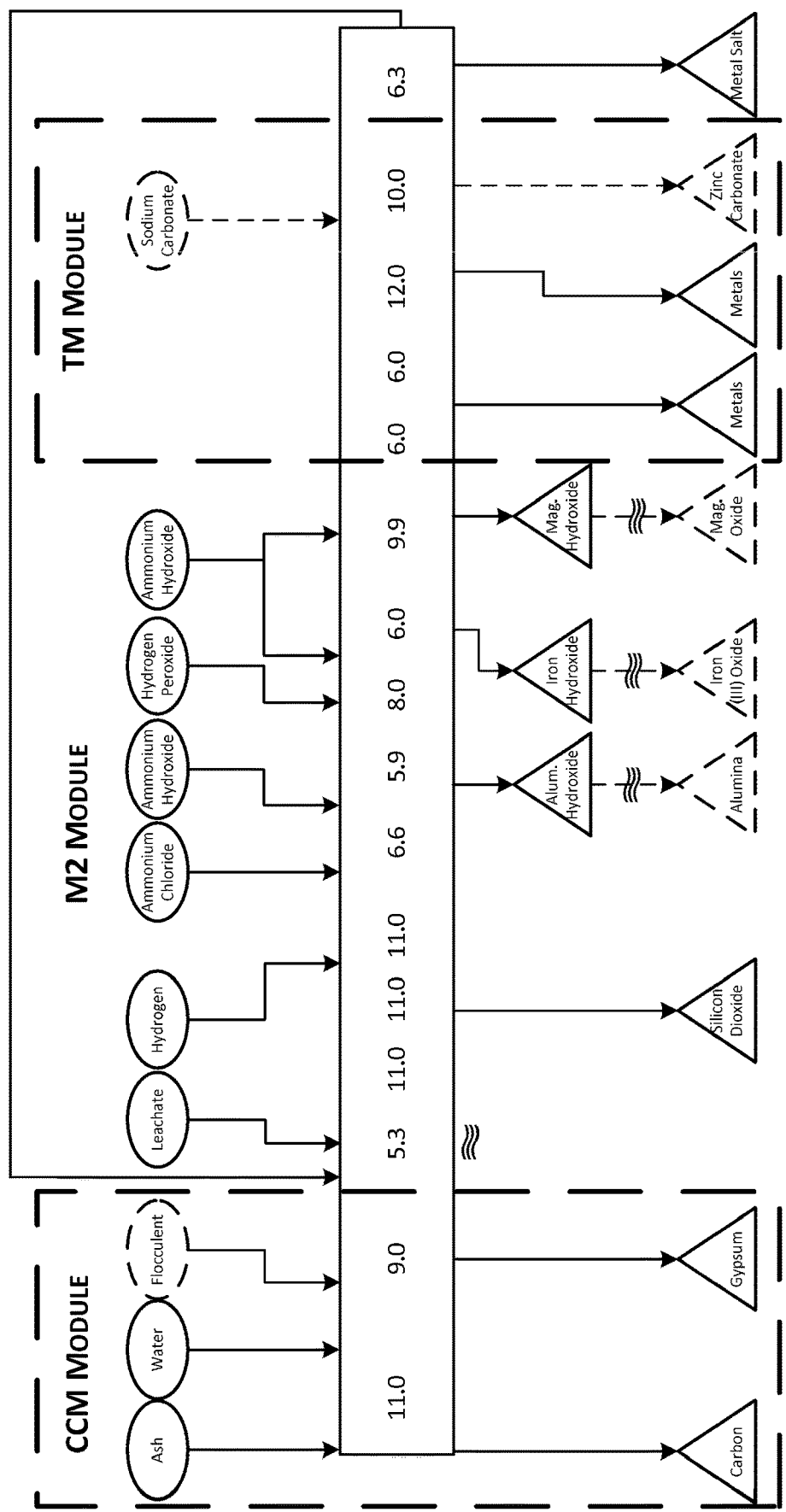
FIG. 18 depicts an example embodiment of a process for converting fly ash into products.
Figure 19:
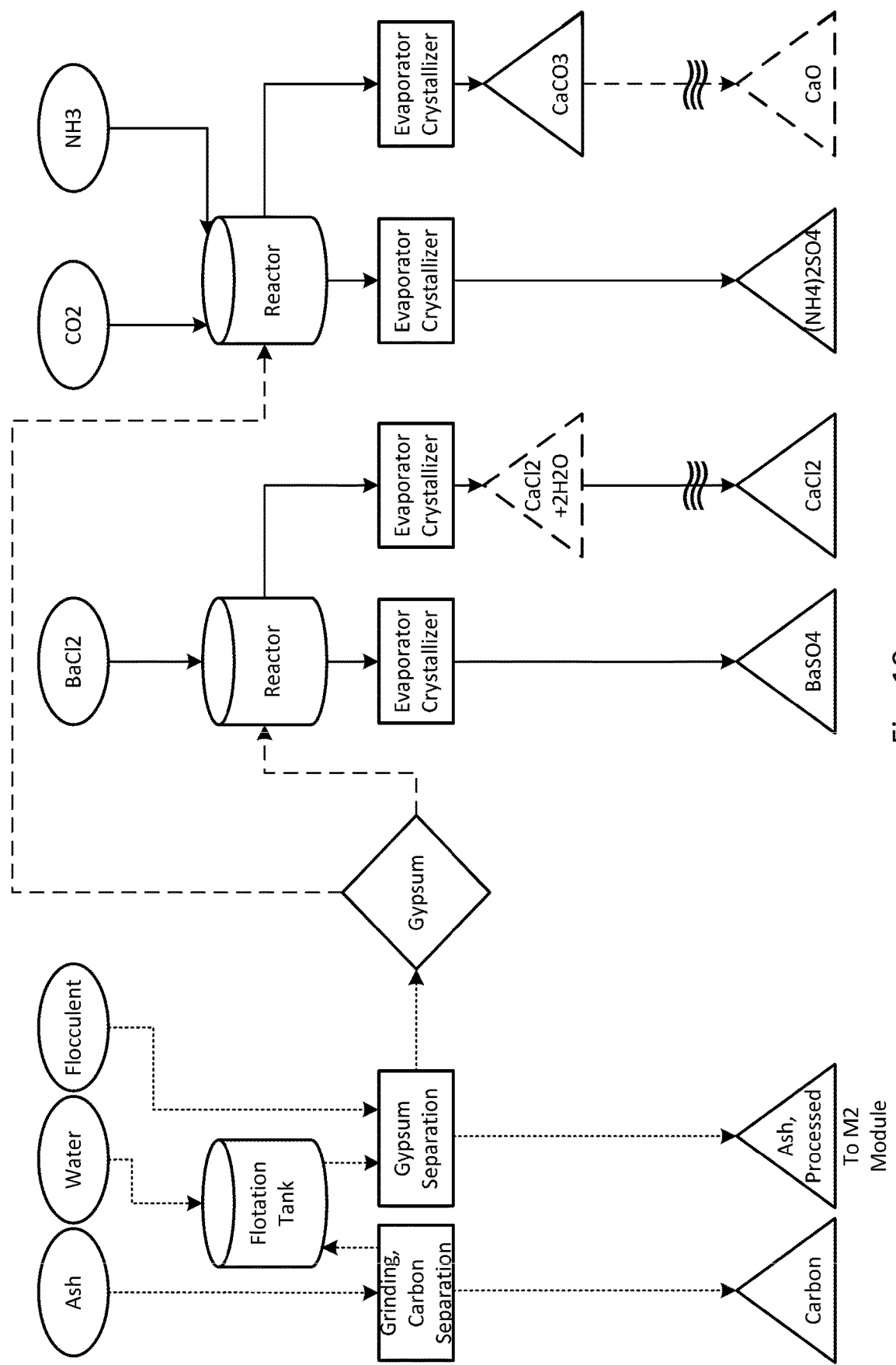
FIG. 19 depicts an example embodiment of a CCM Module according to FIG. 3.
Figure 20:
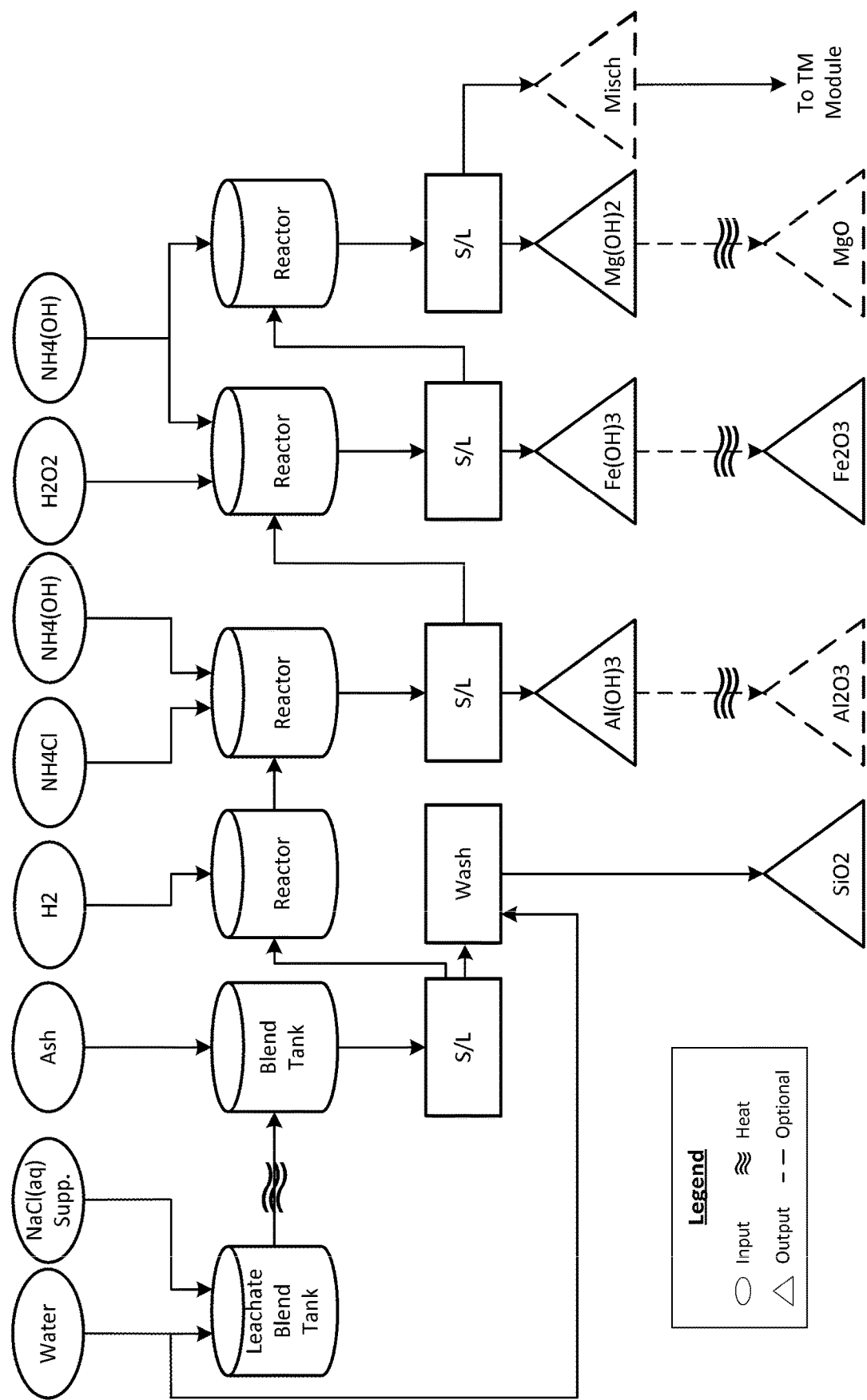
FIG. 20 depicts an example embodiment of an M2 Module according to FIG. 3.
Figure 21:
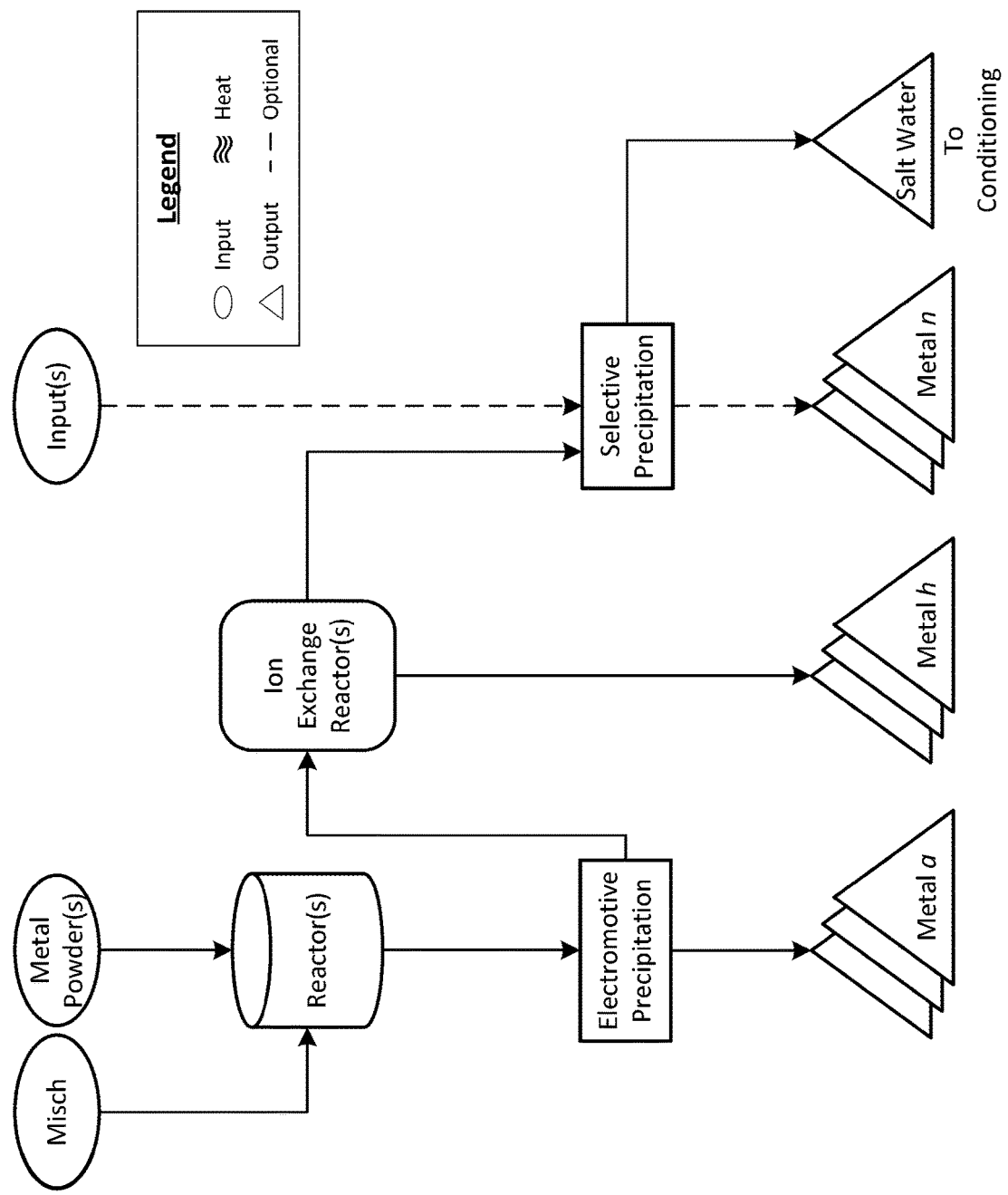
FIG. 21 depicts an example embodiment of a TM Module according to FIG. 3.
Figure 22:
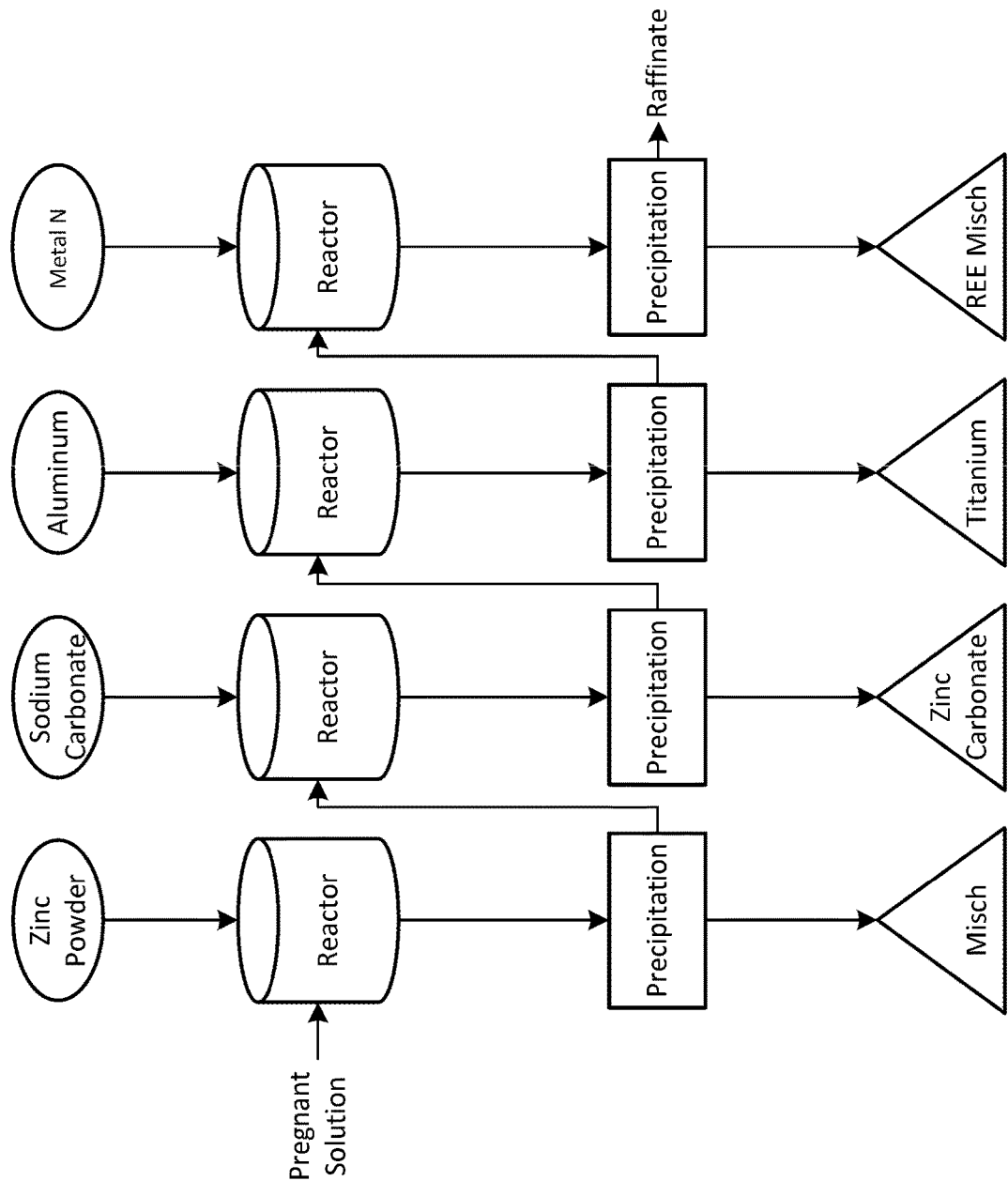
FIG. 22 depicts an alternate embodiment of a TM Module according to FIG. 3.
Figure 23:
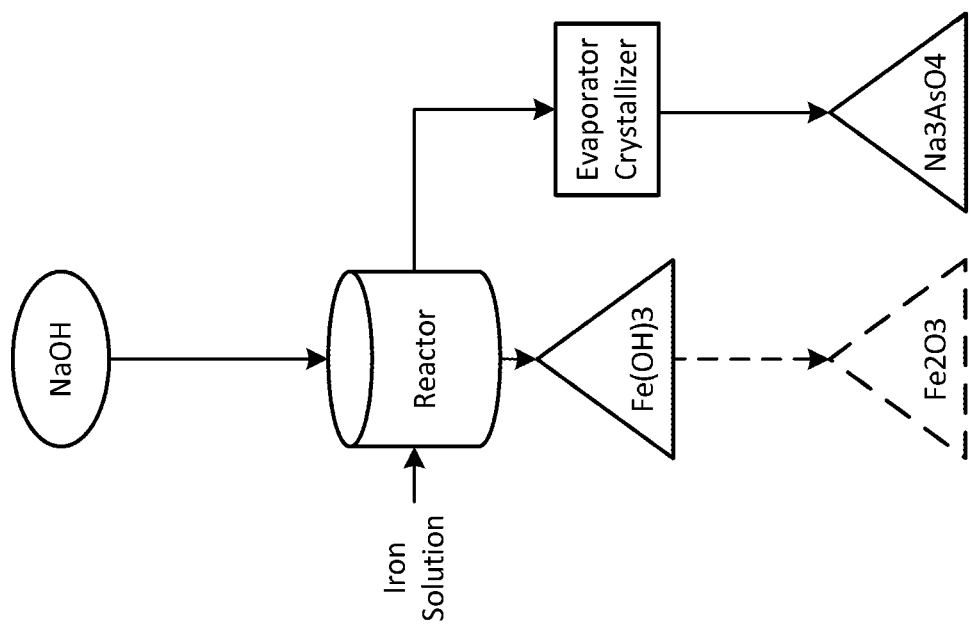
FIG. 23 depicts an example embodiment of a process for capturing arsenic in coal fly ash.
Figure 24:
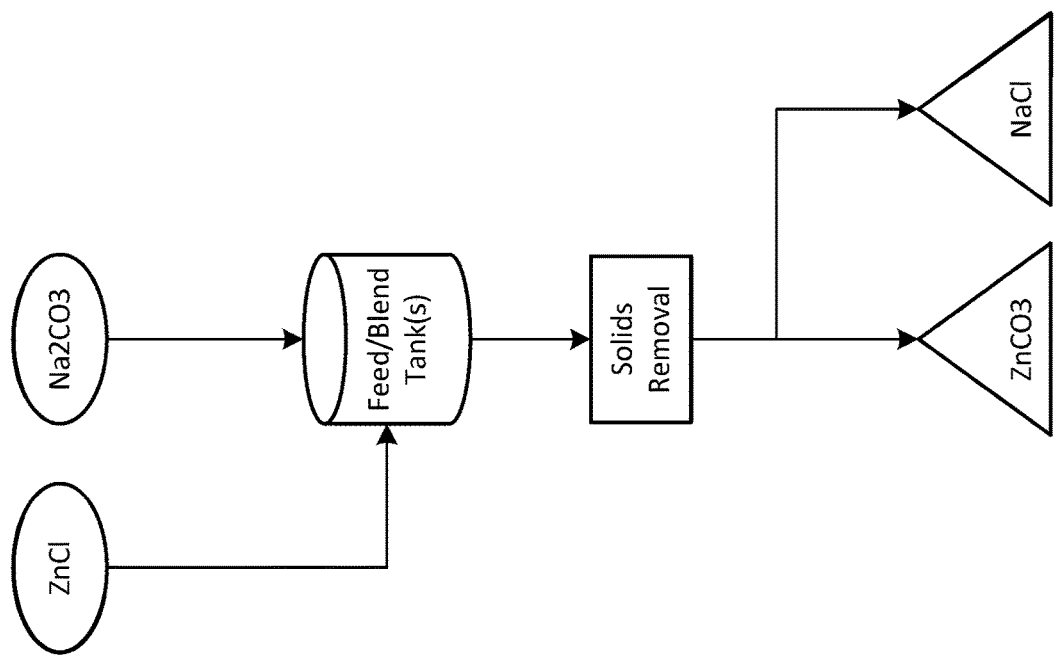
FIG. 24 depicts an example embodiment of a process for capturing zinc from coal fly ash.

FIG. 17 is an example embodiment of a software window for exporting process analysis results. This dialog interface provides GUI for capturing the input configuration, intermediate calculations, and outputs for a simulation as a machine-readable file, such as a CSV or MS Excel workbook.

FIGS. 18 through 24 depict example embodiments of processes and sub-processes for converting fly ash into products.

To perform calculations the system may reference one or more internal or external databases. The system performs pre-defined calculations based upon user selections and inputs such as performing mass balance, pH analysis, temperature and heating/cooling requirements, overall process efficiency, and economic analysis. In some embodiments, the system may provide suggestions to the user to improve various aspects of the analysis based on their inputs such as suggesting an alternative output with higher market value or a piece of equipment that requires smaller maintenance and energy budget.

The user may perform what-if analyses that may be displayed together for comparison or separately, per user preferences. The user may select any number of specific variables and set ranges to calculate and display. The user may select how they results of the analyses are displayed. If the user chooses to output separate what-if analyses with a single query they may be presented with an option to either save/export the entire set of analyses as one document (in their desired format) or in separate documents (which may be saved individually in different formats or may be saved in the same format). If the user chooses to save/export the results of a what-if analysis separately they may have the option of manually naming each or choosing a specific pre-defined naming format (which may be set in preferences) which may be used to automatically apply names to each file. The user may view and accept the filenames prior to save/export or it may auto-save using the prescribed format without requesting user review, per user defined preferences.

When saving the analysis, the system may perform a check that the analysis has been run with the most updated variables before saving. The user may be presented with a chance to confirm or deny an update prior to saving. Prior to exporting an analysis, the user may be prompted with a chance to confirm their input values and to review their selections for any mistakes. These checks may be toggled on or off per user preferences.

Output data graphics may be generated based upon user inputs. They may change dynamically as inputs vary. The user may manually edit data graphics and or individually or globally lock data graphics for editing. The user may change how data is depicted. Data graphics may be changed while retaining the value. For instance, temperature may display as a value initially but can be changed to a more visual color display or temperature may display as both a value and a color.

The method and format of data delivery may be changed by the user to meet their presentation needs; however, all requested information may be available to the user regardless of final visual style. The user may pick and choose which data to present. For instance, the user may have selected a full in-depth analysis to be performed but may want to create a simplified elevator-pitch style report highlighting only a simple overview of the final results.

The analysis may be saved in an interactive pdf, static pdf, xml, doc, jpeg or png, or other visual medium for delivery, distribution, or display. Exported analyses may be editable in other programs. The user may select the resolution of the output. The user may preset output resolution in preferences including varying resolution that is dependent on the type of output for instance text may be preset to a lower resolution than images. The output resolution may also be preset for output type for instance image files may be selected to save at a high default resolution and pdfs may be selected to save at a lower resolution.

Users may choose from report templates to auto-load the analysis into predefined formats. The templates may be set to be editable or locked by the user depending on preferences. Templates may exist for specific export formats, report formats, or for specific page types within the analysis. Specific page types may comprise process descriptions, flow charts, tables, assumptions, table of contents, title page, data comparison pages, and other various page types. Users may create their own templates. The user may edit the analysis as desired prior to exporting. For instance, the user may reorganize the order of the pages, rearrange elements on each page, move information from one page to another, delete undesired pages or information, add pages, add text or other information or graphics, recolor components, add/remove backgrounds, update labels, edit fonts, and make any other desired changes to the report format. The user may save the report format as a template for reuse. The user may set one or more default report templates in preferences which may be applied per export format, input characterization, or other settings. The user may select all pages or only certain pages for export.

Alternatively, the user may manually create a report from scratch. The user may be presented with one or more of a graph, table, chart, matrix, or other data presentation medium depicting the process flow, economic analyses, mass balances, pH scales, process temperatures, or other provided/desired data. Various visual displays such as charts, graphs, and tables may be selected from and placed onto one or more pages as desired.

Users may have the ability to customize the output with qualities comprising font, color scheme, theme, company name and or logo, and confidentiality markings. They may also be able to select what type of data output style they want, such as pie charts, raw outputs, or other data delivery methods.

The user interface may be customizable such that the user may edit which toolbars, panes, windows, or other user functionalities are present on the screen during various operations. The user may also edit the location of the various toolbars, panes, windows, or other user functionalities either universally across documents and or analyses or individually per document and or process. Additionally, the user may set themes and color preferences for the windows as well as for the outputs that may be displayed and or exported.

All preferences including aesthetics, navigation, units, and process-specific preferences may be set individually to either apply globally or per analysis. Preferences may be edited at any time. Preferences may be locked by a user or administrator. Preferences may be password protected.

Some embodiments may incorporate a control panel from which the user may control how the various operations are performed. The user may edit preferences to choose how the functions are arranged and shown, for instance the user may choose to have all functionality laid out in separate tabs on the same window or in separate windows. The user may change how the input windows are displayed and in what order. The user can specify which variables may be edited and which are pulled from a database. For instance, the user may prefer that all material values be pulled from a database and remain locked for editing.

A password and/or encryption may be applied to any specific analysis or globally. Users may also password-protect their analysis exports. Any one or more function in the system may be password protected.

In some embodiments, the system may learn from user interaction and or from external sources. Users may enter or upload data to the system to teach it about new processes, alternative processing options, alternative equipment, updated chemical process data, and the like. The system may learn actively or passively according to user preferences. Alternatively, the user may choose to disallow learning.

The system includes one or more internal and or external databases which it accesses to provide options to the users and to perform analyses. Depending on user preferences the databases may update regularly for instance at predefined intervals, upon user specified action (such as file open or close), or when manually selected. Users may manually upload information to the databases individually or in bulk. Users may manually edit the databases and or lock the databases.

The hydrometallurgical process for removing metals from coal fly ash (CFA) extends the range of beneficial uses of CFA in other than encapsulated forms, such as in high strength cements. This process is suitable for both Class F and Class C fly ashes that are commonly produced as a byproduct of coal combustion in the United States. The removal of the heavy metals permits the use of CFA in many beneficial applications including, but not limited to, agricultural uses such as fertilizers, soil supplements or amendments, and filler materials for the plastic, paper, and paint industries; as well as the production of zeolites for a multitude of other possible uses.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of two computing components, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some embodiments, a computer readable medium may comprise non-transitory computer readable medium (e.g., tangible media). In addition, in some embodiments, a computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Processes or steps described in one implementation can be suitably combined with steps of other described implementations.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray.RTM. disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

It should be understood that the claims are not limited to the precise configuration and components illustrated above. Various modifications, changes and variations may be made in the arrangement, operation and details of the methods and apparatus described above without departing from the scope of the claims.

It should be noted that there are many different and alternative configurations, devices and technologies to which the disclosed embodiments may be applied. The full scope of the embodiments are not limited to the examples that are described below.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

What is claimed is:

1. A system for pricing and creating one or more products, comprising:
   an asset backed token, wherein the asset-backed token derives its value from one or more assets in a feedstock derived from an industrial process, wherein the one or more assets comprise various rare earth metals and minerals and wherein the industrial process is an agricultural process for the production of fertilizers, soil supplements and amendments;
   a smart contract, wherein the smart contract is a non-transitory computer-readable medium storing computer protocols configured to at least one of facilitate, verify, and enforce the performance of a contract;
   a processor configured to implement the smart contract including the steps of:
      use the processor to associate a process control logic to a manufacturing process to produce one or more products based on a first market value, wherein the first market value is derived from background calculations and analysis of the one or more assets represented by the asset backed token,
      determine a second market value corresponding to the one or more assets, wherein the second market value is compared to the first market value to determine which of the one or more products has a higher market value in accordance with the smart contract,
      responsive to determining the higher market value, use the process control logic to adjust at least one processing step such that a higher market value product is produced, responsive to producing the higher market value product,
      use the smart contract to document the results in a distributed ledger,
   wherein the distributed ledger is at least one of a collective database that is consensually shared, synchronized between a network of nodes across multiple locations, and operates in either private mode, public mode, or a combination thereof,
   wherein the private mode of operation of the distributed ledgers is owned and maintained for the exclusive benefit of at least one of an owner, a member of a specific exchange, and a distributed exchange, and
   wherein the distributed exchange is based on a blockchain validation and verification kept in the distributed ledger.

2. The system of claim 1, wherein the feedstock comprises raw materials, wherein the raw materials include pre-manufactured components.

3. The system of claim 2, wherein the pre-manufactured components are at least one of processed metals, processed chemicals and processed minerals.

4. The system of claim 1, wherein the asset-backed token represents at least one of measurable, quantifiable, verifiable physical, or economic characteristics.

5. The system of claim 4, wherein characteristics of the asset-backed token include at least one of volume, mass, value contribution ratio, current market value, elemental makeup, mineral species, grading data, location of origin, and processing facility data.

6. The system of claim 3, wherein the process control logic is linked to at least one of a market value of a complete process, wherein manufacturing decisions are driven by at least one of a future value, location of source material, and market demand.

7. The system of claim 6, wherein the processing decisions are based on at least one of a predetermined processing strategy, automatically generated decisions, dynamically generated decisions, and manually generated decisions.

* * * * *